United States Patent [19]

Suk

[11] 4,120,473
[45] Oct. 17, 1978

[54] MOUNTING BRACKET FOR ELECTRICAL BOXES

[75] Inventor: Eugene J. Suk, Pittsburgh, Pa.

[73] Assignee: Midland-Ross Corporation, Cleveland, Ohio

[21] Appl. No.: 876,868

[22] Filed: Feb. 13, 1978

Related U.S. Application Data

[62] Division of Ser. No. 745,396, Nov. 26, 1976.

[51] Int. Cl.² ............................ H02G 3/08; F16B 2/24
[52] U.S. Cl. .................................. 248/205 R; 220/3.5; 248/DIG. 6
[58] Field of Search ............ 248/205 R, 27.1, DIG. 6; 85/71; 220/3.6, 3.5, 3.3, 3.4, 3.9, 3.92; 174/58

[56] References Cited

U.S. PATENT DOCUMENTS

| | | | |
|---|---|---|---|
| 1,295,734 | 2/1919 | Greubel | 85/71 |
| 1,349,977 | 8/1920 | Mulkern | 85/71 |
| 2,491,742 | 12/1949 | Lein | 248/27.1 |
| 2,812,149 | 11/1957 | Appleton | 248/27.1 |
| 2,908,416 | 10/1959 | Rudolph et al. | 85/71 UX |
| 2,978,135 | 4/1961 | Furnish | 248/DIG. 6 |
| 3,462,039 | 8/1969 | Gies | 220/3.6 |
| 3,614,144 | 10/1971 | Hodges | 85/71 X |

Primary Examiner—J. Franklin Foss
Attorney, Agent, or Firm—H. Duane Switzer

[57] ABSTRACT

A mounting bracket for electrical boxes includes a base having a deformable portion extending therefrom and terminating in a flange having a screw receiving bore. A screw freely extends through a hole in the base into threaded engagement with the bore and the flange. Tightening of the screw moves the flange toward the base to deform the deformable portion laterally for engaging a wall to hold an electrical box or the like in an opening through the wall. The base has legs extending therefrom in a direction opposite from the deformable portion for location on opposite sides of a boss on an electrical box. Wings extend outwardly from the legs and hook portions extend back toward the base from the wings for engaging shoulders on an electrical box.

3 Claims, 10 Drawing Figures

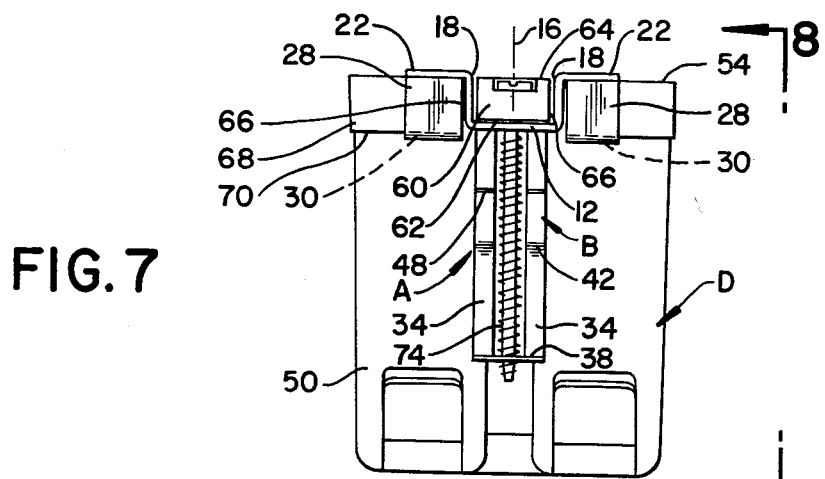
FIG. 7
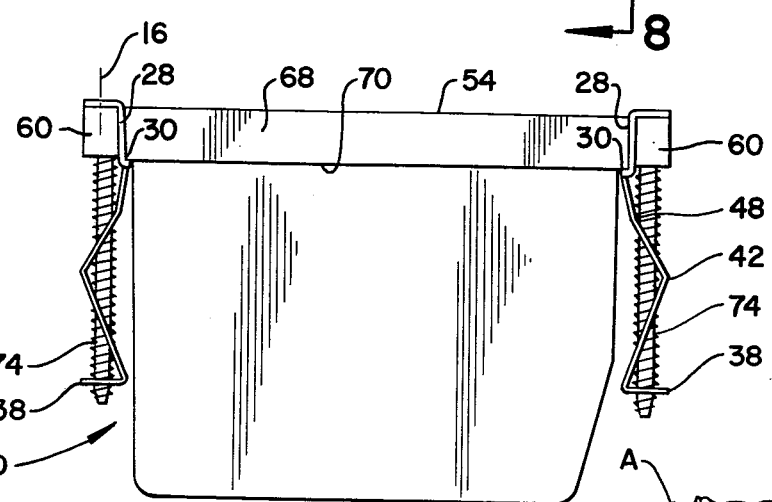
FIG. 8
FIG. 9
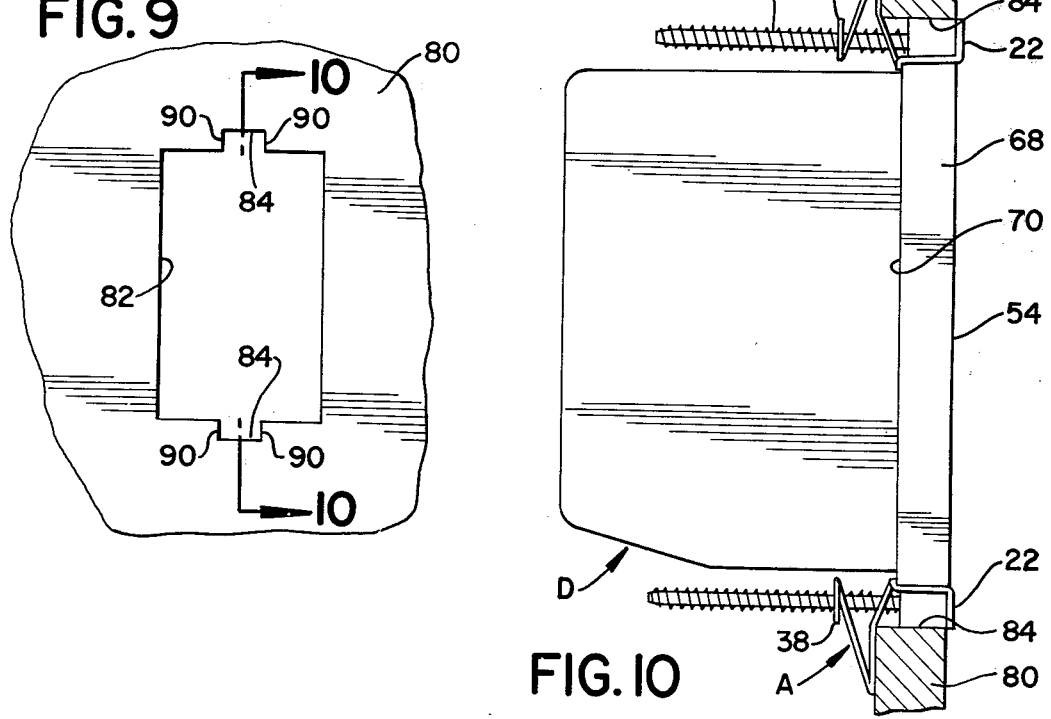
FIG. 10

MOUNTING BRACKET FOR ELECTRICAL BOXES

This is a division of application Ser. No. 745,396, filed Nov. 26, 1976.

BACKGROUND OF THE INVENTION

This application pertains to the art of mounting brackets and, more particularly, to mounting brackets for mounting electrical outlet and switch boxes or the like in wall openings.

For old work as when upgrading electrical wiring in an existing building, it is necessary to mount electrical outlet and switch boxes in wall openings and the box must be secured to the wall which is often of plaster and will not hold screws firmly, particularly adjacent the wall opening which receives the box.

Many arrangements have been proposed and adopted for mounting electrical boxes in wall openings. U.S. Pat. No. 2,083,415 issued June 8, 1937, to Wood discloses an arrangement wherein deformable mounting brackets are attached to an electrical box by separate screws 9. This makes manufacture and assembly of the entire device relatively expensive due to the need for the additional screw and attachment of same to the box. In addition, devices of the type disclosed by Wood essentially make line contact with the back corner of a plaster wall adjacent the opening which receives the box and the wall tends to crumble in that area. U.S. Pat. No. 2,491,742 to Lein discloses another arrangement wherein a separate screw or a mounting clip is required to attach the deformable bracket to the box. In the arrangement of Lein, the deformable bracket is not firmly held against rotation unless screws are used for holding the bracket to the box. U.S. Pat. No. 2,812,149 issued Nov. 5, 1957, to Appleton discloses another arrangement wherein deformable brackets are held to the box by the resilient action of the bracket. With an arrangement of this type, it is possible to displace the box from the mounting brackets. Also, the deformable brackets engage the wall adjacent the corners of the opening where the wall may crumble. U.S. Pat. No. 2,908,416 issued Oct. 13, 1959, to Rudolph et al discloses another arrangement wherein the same screw which holds the deformable bracket to the box is also used for deforming the deformable bracket. This is a very desirable arrangement. The deformable portion of the Rudolph mounting bracket is deformed in such a manner that essentially line contact is made between the bracket and the corner of the wall opening. In addition, the arrangement of Rudolph and others requires separate plate portions on the box for engaging the exterior of the wall adjacent the opening therein. U.S. Pat. No. 3,614,144 issued Oct. 19, 1971, to Hodges discloses another mounting bracket which also requires a separate flange on the device being mounted for engaging the exterior of the wall around the opening. In addition, the bracket of Hodges deforms in such a manner that essentially line contact is made with the back corner of a wall.

SUMMARY OF THE INVENTION

A bracket of the type described includes opposite legs extending outwardly from the base opposite from the deformable portion thereof. The legs extend along opposite sides of a boss on an electrical box for preventing rotation of the bracket when the deforming screw is tightened. Integral wings extending outwardly from the legs engage the outer surface of a wall adjacent the opening therein. Hook portions extend back toward the base from the wings for engaging shoulders on the box for insuring a positive connection between the box and clip and firmly securing same in a wall opening.

It is a principal object of the present invention to provide an improved mounting bracket for electrical boxes or the like.

It is also an object of the invention to provide an improved mounting bracket having integral portions for engaging the outer surface of a wall adjacent an opening therein and for engaging shoulders on an electrical box.

It is an additional object of the invention to provide an improved mounting arrangement for electrical boxes which is very economical and relatively simple to install.

BRIEF DESCRIPTION OF THE DRAWING

FIG. 7 is a bottom view taken generally on line 7—7 of FIG. 6;

FIG. 8 is a side elevational view taken generally on line 8—8 of FIG. 7;

FIG. 9 is a partial elevational view of a wall having an opening therein for receiving the electrical box of FIGS. 6–8; and FIG. 10 is a cross-sectional elevational view taken generally on line 10—10 of FIG. 9.

DESCRIPTION OF A PREFERRED EMBODIMENT

Figure 1:
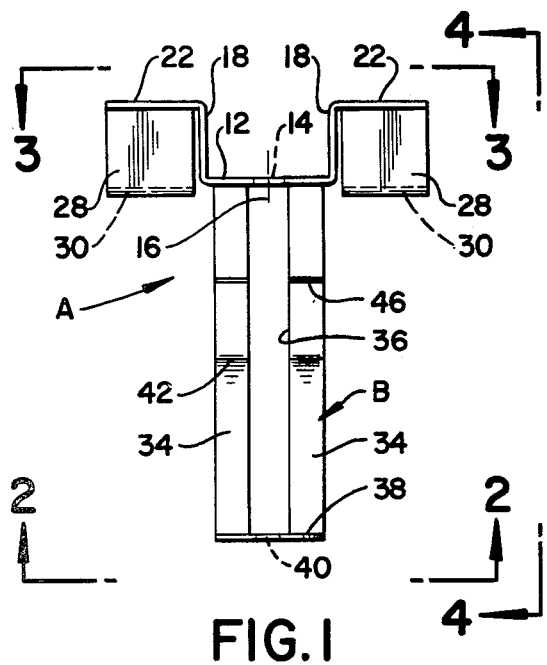
FIG. 1 is a top plan view of a mounting bracket constructed in accordance with the present invention.
Figure 2:
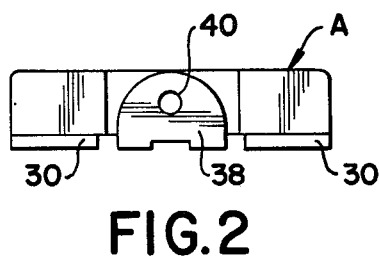
FIG. 2 is an end elevational view taken generally on line 2—2 of FIG. 1.
Figure 3:
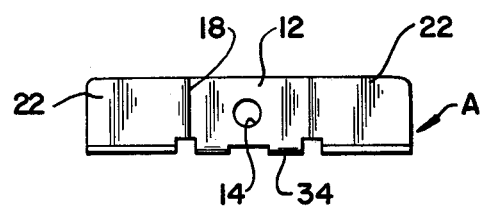
FIG. 3 is an end elevational view taken generally on line 3—3 of FIG. 1.

With reference to the drawing, FIG. 1 shows a metal mounting bracket A including a flat base 12 having a substantially centrally located screw receiving hole 14 therethrough extending along an axis 16 corresponding to the screw axis when it is received through the hole 14. Opposite flat legs 18 extend outwardly in spaced-apart parallel relationship to one another substantially perpendicular to base 12. Substantially flat wing portions 22 extend outwardly from the ends of legs 18 substantially perpendicular thereto. Opposite integral hook portions 28 extend rearwardly from the lower edges of wing portions 22 back toward base 12. Hook portions 28 terminate in downwardly extending hooks 30 spaced slightly on the other side of base 12 from wing portions 22.

Figure 4:
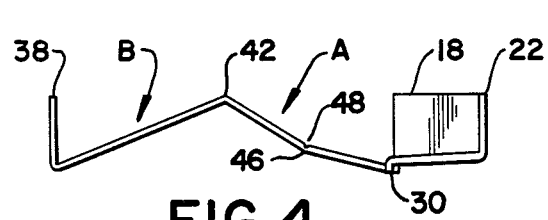
FIG. 4 is a side elevational view taken generally on line 4—4 of FIG. 1.

A deformable portion B extends outwardly from the lower edge of base 12 in a direction opposite from legs 18. Deformable portion B is bent as best shown in FIG. 4 but may be considered to extend from base 12 generally along axis 16. Deformable portion B includes opposite legs 34 defining an elongated open slot 36 therebetween. Deformable portion B terminates in a flange 38 having a screw receiving hole or bore 40 therethrough lying on axis 16. Flange 38 is spaced substantially from base 12 and in the arrangement shown extends upwardly from deformable portion B in the same direction as base 12 extends upwardly from the other end of deformable portion B. Deformable portion B includes a relatively sharp transverse bend 42 located intermediate base 12 and flange 38. Bend 42 is in the same direction as the direction in which base 12 and flange 38 extend upwardly from deformable portion B. Bend 42 is located at approximately the same height as the free upper terminal edges of base 12 and flange 38.

Figure 5:
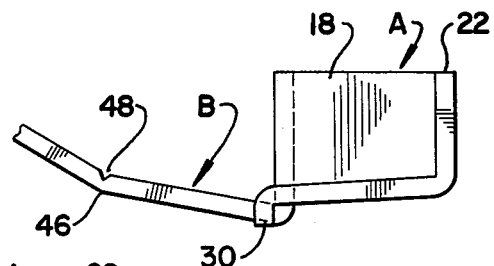
FIG. 5 is an enlarged partial side view similar to FIG. 4.

A second relatively shallow bend 46 is formed in deformable portion B intermediate sharp bend 42 and base 12. Shallow bend 46 extends in an opposite direction from bend 42 and the surface of deformable portion B is transversely scored as best shown at 48 in FIG. 5 on the upper surface thereof. That is, score 48 is located on the same side of deformable portion B as flange 38 and base 12.

Mounting bracket A is used with a molded plastic electrical switch or outlet box D as shown in FIGS. 6–10. Box D is shown as being generally rectangular and including a continuous peripheral wall 50 upstanding from a bottom wall 52 and terminating in a peripheral edge 54 around a box opening 56 to a cavity within which electrical devices or connections are located. Box D has tapped holes as at 58 therein for receiving screws to secure a switch or outlet thereto. Box D has oppositely located outwardly extending bosses 60 each having a rear surface 62 facing generally toward rear wall 52, and a front surface 64 facing toward opening 56. Opposite side surfaces 66 extend between rear and front surfaces 62 and 64. A peripheral thickened portion 68 of box D extends from peripheral edge 54 a short distance along peripheral wall 50 toward rear wall 52 and terminates at a shoulder 70. Shoulder 70 is generally inwardly stepped to provide a surface extending generally parallel to boss rear surface 62. Suitable axial holes are provided through bosses 60 substantially perpendicular to the plane of opening 56 and the plane of peripheral edge 54. The axes of these holes correspond to the axis 16.

Figure 6:
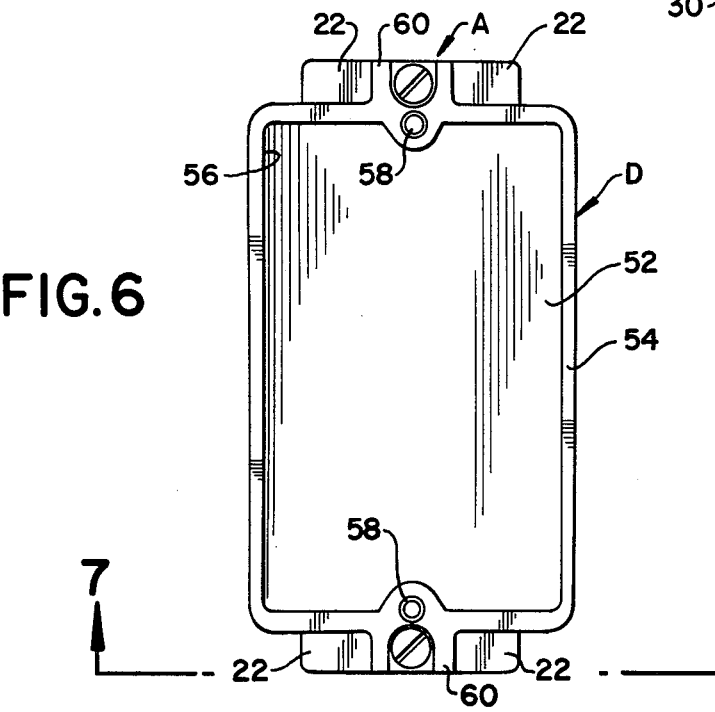
FIG. 6 is a front elevational view of an electrical box having the improved mounting bracket attached thereto.

Mounting brackets A are positioned on box D as shown in FIGS. 6–8. Base 12 is located closely adjacent boss rear surface 62, while legs 18 extend along boss side surfaces 66 substantially engaging same. Wings 22 are located so that their inner plane surfaces facing toward base 12 are located substantially in the same plane as opening peripheral edge 54. Hook portions 28 extend rearwardly and terminal hooks 30 are engaged with shoulder 70 on opposite sides of each boss 60. In the arrangement shown, the thickened portion 68 slopes inwardly slightly from peripheral edge 54 toward rear wall 52 and hook portions 28 are correspondingly sloped. With the arrangement shown and described, hooks 30 are engaged with shoulder 70 to maintain the inner surfaces of wings 22 in substantially the same plane as peripheral edge 54 while the inner surface of base 12 is spaced slightly from rear surface 62 of boss 60. An elongated self-tapping sheet metal screw 74 extends through the aligned holes in bosses 60 and bases 12, and into threaded engagement with the bore in flange 38. The screw extends freely through the holes in base 12 and boss 60. With this assembly, screws 74 hold mounting brackets A on box D and also serve to deform mounting brackets A for securing box D in a wall opening.

FIG. 9 shows a portion of a conventional wall 80 of plaster or the like having a rectangular opening 82 formed therein and dimensioned for receiving box D.

Opposite notches 84 are formed outwardly of rectangular opening 82 for receiving bosses 60 so that the inner surfaces of wings 22 on brackets A will engage the outer surface of wall 80 on opposite sides of notches 84 in the areas generally indicated by numeral 90. When the box is mounted, this arrangement maintains peripheral edge 54 substantially flush with the outer surface of wall 80. Box D having mounting brackets A thereon is pushed through opening 82 to the position generally shown in FIG. 10. Screws 74 are then tightened for moving flanges 38 toward bases 12 and causing deformation of deformable portion B to the general shape shown in FIG. 10. Relatively sharp bend 42 is caused to move laterally outwardly and that portion of deformable portion B lying between relatively sharp bend 42 and base 12 is moved toward the inner surface of wall 80. For many mounting arrangements of the type shown in FIG. 10, that portion of deformable portion B adjacent base 12 will engage the inner edge of the opening through wall 80 so that shallow bend 46 will also bend further and cause deformable portion B to firmly engage the rear surface of wall 80 adjacent the opening therethrough. This arrangement substantially eliminates line contact with the back corner of the wall around the opening therein. Firmer clamping engagement is obtained with the double deformation and by facilitating bending at second bend 46 with score line 48. The double bends at spaced locations in deformable portion B provide enhanced bending action for various wall thicknesses to obtain firmer mounting of box D in the wall opening.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. A bracket for mounting electrical boxes or the like to walls comprising a base having a screw receiving opening therethrough along an axis, an elongated deformable portion extending from said base generally along said axis, a flange on said deformable portion spaced from said base and extending substantially parallel thereto, a hole in said flange around said axis for threadably receiving a screw extended through said opening, a sharp bend in said deformable portion intermediate said base and flange, a shallow bend in said deformable portion intermediate said base and said sharp bend, said deformable portion transversely scored at said shallow bend, said sharp and shallow bends being in opposite directions, opposite legs extending from said base in a direction opposite from said deformable portion, flat wing portions extending outwardly from said legs substantially parallel to said base, and hook portions extending from said wing portions toward said base and terminating at hooks adjacent said base.

2. A bracket for mounting electrical boxes or the like to walls including a base having a screw receiving opening therethrough along an axis and a deformable portion extending from said base in a direction generally parallel to said axis, said deformable portion including a flange extending substantially parallel to said base in spaced relationship thereto and having a screw receiving hole lying on said axis for threadably receiving a screw extending through said opening, the improvement comprising opposite spaced-apart legs extending from said base in an opposite direction from said deformable portion, wings extending outwardly from said legs substantially parallel to said base, and hook portions extending from said wings back toward said base.

3. The bracket of claim 2 wherein said deformable portion includes a sharp bend intermediate said base and flange, and said deformable portion having an opposite shallow bend intermediate said base and said sharp bend.

* * * * *